(12) United States Patent
Barcell

(10) Patent No.: US 10,555,616 B1
(45) Date of Patent: Feb. 11, 2020

(54) ROCKING DEVICE

(71) Applicant: Robert Barcell, Fort Collins, CO (US)

(72) Inventor: Robert Barcell, Fort Collins, CO (US)

( * ) Notice: Subject to any disclaimer, the term of this patent is extended or adjusted under 35 U.S.C. 154(b) by 0 days.

(21) Appl. No.: 16/445,480

(22) Filed: Jun. 19, 2019

Related U.S. Application Data

(60) Provisional application No. 62/745,157, filed on Oct. 12, 2018.

(51) Int. Cl.
| | | |
|---|---|---|
| *A47C 21/00* | (2006.01) | |
| *A45F 3/22* | (2006.01) | |
| *F16C 7/00* | (2006.01) | |
| *A47L 9/02* | (2006.01) | |
| *A63G 9/16* | (2006.01) | |

(52) U.S. Cl.
CPC ............. *A47C 21/006* (2013.01); *A45F 3/22* (2013.01); *A47L 9/02* (2013.01); *A63G 9/16* (2013.01); *F16C 7/00* (2013.01); *F16C 2314/70* (2013.01)

(58) Field of Classification Search
CPC ........ A47C 21/00; A47C 21/006; A47D 9/02; A45F 3/22; F16C 7/00; F16C 2314/70; A63G 9/16
See application file for complete search history.

(56) References Cited

U.S. PATENT DOCUMENTS

| | | | | |
|---|---|---|---|---|
| 483,753 A * | 10/1892 | Washburn | ................. | A45F 3/22 5/120 |
| 657,893 A * | 9/1900 | Lowe | ........................ | F04B 9/02 5/109 |
| 669,980 A * | 3/1901 | Cutten | ...................... | F03G 1/00 185/38 |
| 751,125 A * | 2/1904 | Wertz | ....................... | A47D 9/02 185/38 |
| 1,003,208 A * | 9/1911 | Schaefer | ................... | A45F 3/22 5/120 |
| 1,727,635 A * | 9/1929 | Crane | ...................... | A47D 9/02 310/34 |
| 2,478,445 A * | 8/1949 | Yurkovich | ............... | A47D 9/02 362/130 |
| 3,261,032 A * | 7/1966 | Reardon | .................. | A47D 9/02 5/108 |
| 3,842,450 A * | 10/1974 | Pad | .......................... | A47C 3/02 5/109 |
| 4,491,317 A * | 1/1985 | Bansal | ................. | A47D 13/105 472/119 |

(Continued)

OTHER PUBLICATIONS

12V Automatic Hammock Rocker, https://www.boatstogo.com/automatic-hammock-rocker.asp (Year: 2018).*

*Primary Examiner* — David R Hare
(74) *Attorney, Agent, or Firm* — Kilpatrick Townsend & Stockton LLP

(57) ABSTRACT

A device for rocking a hammock holding a human is described. The device includes a frame, a lever arm, a solenoid, a cord, and a signaling device. The lever arm pivots about a pivot point to move within the frame. The solenoid is connected to the lever arm to apply a force to rotate the lever arm. The lever arm is connected via the cord to the hammock. As the lever arm moves from one position to another within the frame, the signaling device detects the position of the lever arm and signals to turn on the solenoid to apply a force to the lever arm to rock the hammock.

20 Claims, 8 Drawing Sheets

(56) References Cited

U.S. PATENT DOCUMENTS

| | | | | |
|---|---|---|---|---|
| 4,616,824 | A | * | 10/1986 | Quinlan, Jr. .......... A47D 13/105 472/119 |
| 4,752,980 | A | * | 6/1988 | Nafte ....................... A47D 9/04 5/108 |
| 5,376,053 | A | * | 12/1994 | Ponder .................... A63G 9/16 472/119 |
| 5,615,428 | A | * | 4/1997 | Li ............................ A47D 9/02 5/104 |
| 5,845,350 | A | * | 12/1998 | Beemiller ................ A47D 9/02 5/109 |
| 6,254,490 | B1 | * | 7/2001 | Lawson ................. A47D 13/10 297/273 |
| 6,361,446 | B2 | * | 3/2002 | Lawson ................... A63G 9/16 297/273 |
| 7,159,254 | B1 | * | 1/2007 | Voorting ................... A45F 3/22 5/109 |
| 7,234,177 | B1 | * | 6/2007 | Drevitson ................. A45F 3/22 5/109 |
| 2007/0200406 | A1 | * | 8/2007 | Hathaway ............ A47C 21/006 297/344.1 |
| 2014/0000026 | A1 | * | 1/2014 | Ou ........................... A45F 3/22 5/120 |

* cited by examiner

ROCKING DEVICE

CROSS-REFERENCES TO RELATED APPLICATIONS

This application claims the benefit of U.S. Provisional Application No. 62/745,157, filed Oct. 12, 2018, entitled "ROCKING DEVICE", of which is assigned to the assignee hereof, and incorporated herein in its entirety by reference.

BRIEF DESCRIPTION OF THE DRAWINGS

The present invention is described in conjunction with the appended figures.

Figure 1:
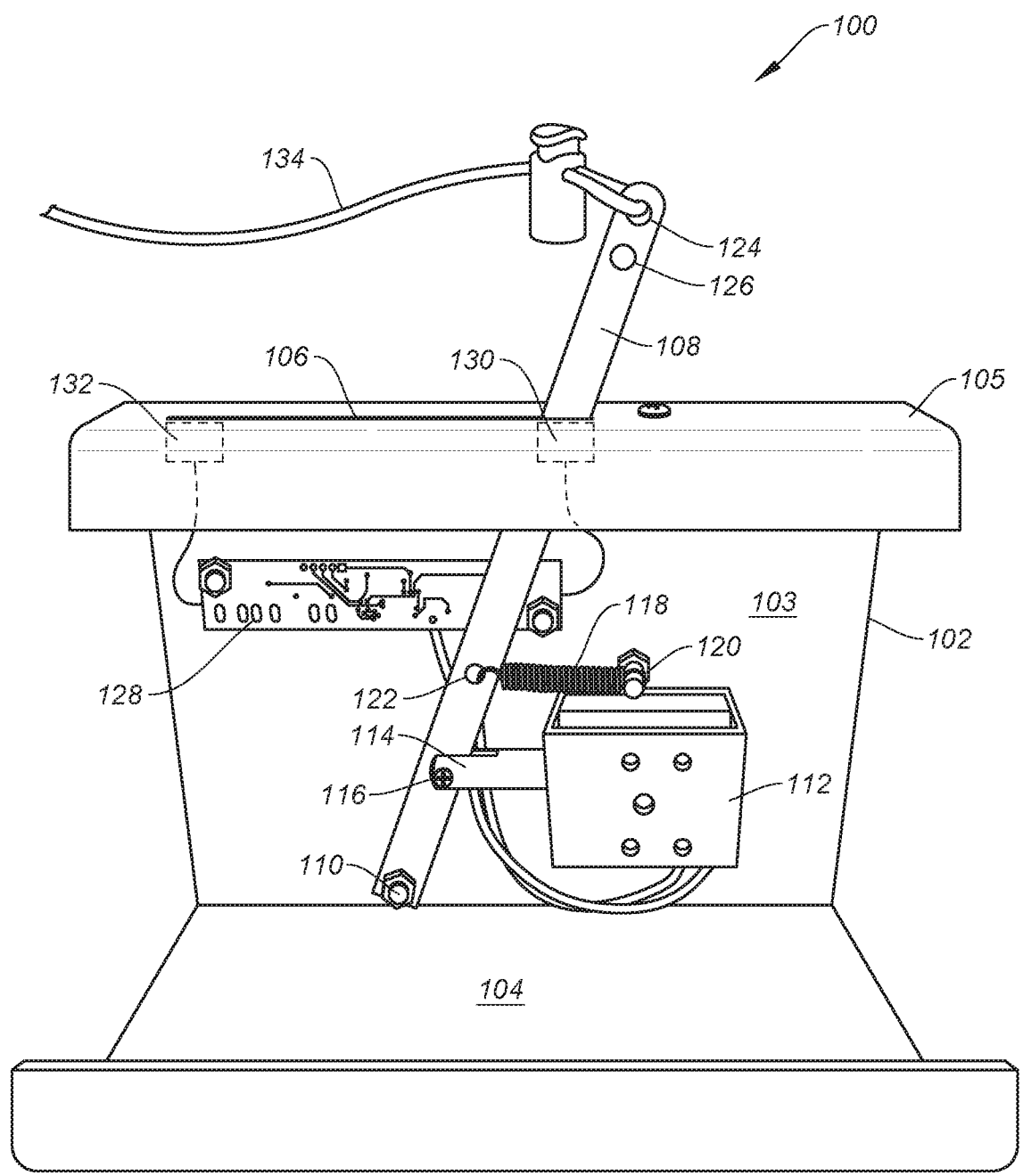
FIG. 1 illustrates a front view of an exemplary device in a first stage of operation.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Described herein are methods and devices for continuously moving or rocking a movable article that moves with a rocking or swinging motion. Such movable articles may include a hammock, porch swing, crib, glider, hammock chair, rocking chair, infant car seat or other furniture or movable article which rocks, swings, or glides. For ease in describing the embodiments, the description will focus mainly on the device swinging a hammock although it should be understood that the device may be used for any of the above mentioned articles.

Existing devices for continuously rocking a hammock typically involve a reversing motor or an oscillating device. Some existing devices operate by attaching to the pipe frame of the hammock and applying a push force against the frame. Some of the devices may be spring loaded. Some of the devices may include a speed adjusting mechanism. However, the speed adjusting mechanism does not automatically accommodate a change in the swing characteristics of the hammock that may be caused by different users lying in the hammock (e.g., change in rocking frequency due to change in oscillation radius, length, or user preferences), and thus, the device may apply a force opposite to the swing direction or apply a force that does not match the oscillation of the hammock. Instead, the speed adjusting mechanism must be adjusted or tuned to accommodate a change in the swing characteristics of the hammock. Some existing devices use an oscillating device and an arm, but such devices are typically expensive due to costs associated with the required gear motor, the accompanying mounting platform, and other various connecting components. The oscillating device may also not match a natural swinging motion of the hammock and thus, the oscillating device may force the hammock to swing in an unnatural rhythm or may work counter to the natural swinging motion of the hammock.

The present technology described herein can automatically adjust to the natural swinging rhythm or frequency of the hammock while being low-cost, compact, and portable. Because the device described herein is able to work in harmony with the natural swinging rhythm or frequency of the hammock, at no time is the device acting in a manner that opposes or is counter to the natural movement of the hammock. Rather, entirely all of the applied force is transmitted to the hammock in a direction that the hammock is already swinging or moving.

There are several advantages of the device described herein over existing rocking devices. For example, the device employs a solenoid that applies a pull or push force in a given direction only when the hammock begins to swing in that direction. Because the solenoid applies the pull or push force only when the hammock begins to swing in that direction, the timing for application of the pull or push force is essentially controlled by the natural rhythm of the hammock. In other words, a force is applied by the device in response to the natural rhythm of the hammock or other movable article. Consequently, the timing for applying the force is automatically adjusted as the natural rocking frequency of the hammock or moveable object changes, which may be due to a different user using the hammock or due to the device being used to rock a different movable object. Further, because the force is applied in the same direction in which the hammock swings, the amount of force applied can be relatively small to keep the hammock continuously rocking or swinging back and forth. The user can thus enjoy a continuous, gentle swing without experiencing any discomfort that may be applied by conventional devices, which are typically either too abrupt or not in sync with the natural frequency of the hammock or article being rocked.

Additionally, because the device is powered by a solenoid which requires very little power to operate, and because the solenoid operates for only a minor portion of the time that the hammock is rocking, the device uses a small fraction of the power used by conventional, motor-powered systems. As a result, battery power is not practical for a conventional system because it requires a normal car battery to offer even relatively short run times of an hour or so. By contrast, a battery smaller than a common brick will power the system described herein for 7-10 hours. This makes the device described herein highly portable and practical even for backpackers.

When the device is used to rock an object that has a single pivot point, such as a hammock chair, some of the pulling force may result in a slight sideways movement of the object. This slight sideways movement may result in an essentially circular or elliptical swinging motion or path of the object being achieved. If the device is positioned too close to the object, such as within three times a swinging length of the object, the circular or elliptical path of the object may result in the lever arm not being pulled to the first pivot end position that is required to trigger and activate the solenoid. To alleviate this issue, the device may be positioned farther away from object, such as greater than five feet from the object. The increased distance of the device from the object being rocked ensures that the pull cord pulls on the lever arm in a more linear manner and minimizes the effects of the sideways motion of the object on the device. In such instances, the pull cord should have an elastic section and a non-elastic section. The elastic section allows the pull cord to compensate for the difference in any pull force from the device and the motion of the object while the non-elastic section ensures that sufficient tensile forces are imparted or transmitted to the object rather than being absorbed in the pull cord. Stated differently, the non-elastic section prevents the pull cord from dampening the pulling force due to the increased length of an elastic pull cord that would be required to connect the device and the object.

Turning now to the figures, FIG. 1 illustrates a front view of a device 100 for swinging a hammock. As shown, the device 100 includes a housing that has a base 104, a side panel 103, and a top panel 105. The base 104 supports the device 100 on the ground in a substantially upright position. The base 104 may extend beyond the side panel 103 and/or the area covered by the top panel 105, and the extended portion of the base 104 may support a removable battery unit (shown in FIG. 5) to power the device 100. The device 100 utilizes a solenoid 112, or other force generating mechanism, that is configured to apply a push or pull force that is transferred to the hammock to rock or swing the hammock. As described herein, only a small amount of force is required from the solenoid to cause the hammock to rock or swing. The device 100 can be battery-powered since only a small amount of force is required to keep the hammock continuously rocking. As such, the device 100 is portable and can be operated anywhere the hammock or other movable article may be set up, including both indoors or outdoors. The battery unit, which may be about the size of a brick, may also function as a weight that maintains or anchors the device 100 in position relative to the hammock. The device 100 may weigh between three and six pounds. In some embodiments, the device 100 can be powered by an external power source (e.g., car battery, wall outlet, etc.) using a power cord or cable that connects the device 100 with the external power source.

Side panel 103 may serve as a mounting board to which the various components of the device 100 may be mounted. As shown, a lever arm 108 is mounted to the side panel 103 such that the lever arm 108 is able to pivot or swing in a plane substantially parallel to the side panel 103. A pivot point 110 of the lever arm 108 may be positioned at or near one end of the lever arm 108. In the illustrated embodiment, the pivot point 110 is created by a screw or other mechanical fastener that attaches the bottom end of the lever arm 108 to the side panel 103. As will be discussed in greater detail below, the attachment point 124 of the pull cord 134 to the lever arm 108, and/or the attachment point 116 of the plunger 114 to the lever arm 108 may be configured to achieve various desired rocking effects and/or pull forces.

An upper portion of the lever arm 108 extends outward from the top panel 105 through a slot 106 in the top panel 105. The slot 106 may include sound dampening and friction reducing materials that minimize frictional engagement of the lever arm 108 with the top panel 105 and that minimize or eliminate noise as the lever arm 108 pivots within the device 100. The upper portion of the lever arm 108 includes one or more apertures 126 for attaching a pull cord 134 to the lever arm 108 at attachment point 124. The apertures 126 may be positioned at various locations along the length of the lever arm 108 to achieve different lever arm ratios (discussed below). A lower portion of the lever arm 108 is attached to the solenoid 112 and in particular to a plunger 114 or ferromagnetic rod of the solenoid 112. In the embodiments shown, a pull solenoid is used. A push solenoid may be implemented in some embodiments although the position of the solenoid 112 in relation to the lever arm 108 would be reversed from the configuration illustrated. A control circuit 128 for the solenoid 112 is mounted on the side panel 103. One or more signaling devices 130, 132 for activating or deactivating the solenoid 112 are positioned on the top panel 105 at the lever arm's pivot end positions. The signaling devices 130, 132 may include switches, including the cam device described with respect to FIG. 8 below, mechanical and electrical, as well as optical, magnetic, or other detection devices, which detect the presence of an object and output a signal to a control circuit 128. For example, a first signaling device 130 is positioned on the underside of the top panel 105 at or near a right most pivot position of the lever arm 108, and a second signaling device 132 is positioned on the underside of the top panel 105 at or near a left most pivot position of the lever arm 108. The second signaling device 132, once engaged by the lever arm 108, sends a signal to control circuit 128 to active the solenoid 112, and the first signaling device 130, once engaged by the lever arm 108, sends a signal to control circuit 128 to deactivate the solenoid 112. In some embodiments, the signaling devices 130, 132 may be replaced by inductive sensors or hall effect sensors as described below with respect to FIG. 7.

The stroke of the lever arm 108 may be adjusted by varying the stroke of the plunger 114, the length that the lever arm 108 that extends above the top panel 105, the connection point of the pull cord 134 and lever arm 108, and/or the period of time the solenoid 112 may be activated during each swing cycle. Additionally, the strength of the solenoid 112 may be adjusted to change the rocking motion (i.e., swing distance) caused by device 100. For example, a solenoid 112 having additional coils or drawing additional power will increase the force applied to the plunger 114 and thereby increase the swing distance of the hammock.

The pull cord 134 is typically an elastic cord that is designed to account for minor differences between the rocking motion of the hammock and the force applied by the lever arm 108. The pull cord 134 accounts for these differences by stretching or elongating as the motion and force vary. The pull cord 134 enables a more even and uniform force to be applied and a more pleasing rocking or swinging motion to be achieved.

Solenoid 112 is a direct current ("DC") powered device and preferably an intermittent type solenoid, which results in a greater pulling force exerted on the lever arm 108 than a similarly sized continuous type solenoid. The control circuit 128 may be configured to activate the solenoid 112 for approximately 25 percent of the swinging motion to maximize the pulling force that is exerted on the lever arm 108. The intermittent solenoids used as described herein require power to be supplied only a fraction of the time, and so control circuit 128 may limit power to the solenoid 112 according to the requirements of the intermittent solenoid specifications. In other embodiments, a continuous type DC powered solenoid may be employed. The continuous solenoid may be advantageous when the pulling force is not a concern, such as when a child seat or other small object is being rocked. Alternating current ("AC") powered solenoids may likewise be employed, although AC powered solenoids may require additional circuitry and/or access to outlet power (not shown). As compared to typical devices, the solenoid 112 generally requires less power because the force applied by the device 100 is in sync with the natural swinging or rocking motion of the hammock.

The control circuit 128 connects to a power source, such as a battery, and also to the solenoid 112 and signaling devices 130, 132, and may be configured to calculate the timing that the solenoid 112 is turned on or off to adjust when the pulling force is applied to the hammock. The control circuit may include a timing circuit, or may include one or more processors to execute commands and programs to activate solenoid 112 based on the position of lever arm 108. For example, control circuit 128 may include a microprocessor that turns on power to solenoid 112 when lever arm 108 contacts the second signaling device 132 and shuts off power to solenoid 112 when lever arm 108 contacts the first signaling device 130. The control circuit 128 may further include a feedback loop or mechanism to sync the lever arm 108 and/or solenoid 112 operating frequency with the natural swinging frequency of the hammock or other movable article.

Along the length of the lever arm 108, an elastic member 118 connects the lever arm 108 to the side panel 103. The elastic member 118 connects to the lever arm 108 at an attachment point 122, which in the illustrated embodiment is located farther from pivot point 110 than the attachment point 116 for the plunger 114. The attachment point 122 may be located nearer to the pivot point 110 than the attachment point 116 for the plunger 114. The elastic member 118 connects to the side panel 103 at attachment point 120, which is positioned horizontally from the attachment point 122 of the lever arm 108. Elastic member 118 provides a force on the lever arm 108 to cause rotation of the lever arm 108 in a first direction (clockwise) around pivot point 110. The first direction is the direction the hammock swings when a force is applied to the hammock by the solenoid 112, or stated differently, when the hammock is swinging toward the device 100. The elastic member 118 is typically pre-loaded so that it exerts a force on the lever arm 108 when the lever arm 108 is rotated to its rightmost location within slot 106 (as depicted in FIG. 1). Elastic member 118 may apply a negligible force or no force on the lever arm 108 when the lever arm 108 is located at its rightmost position. The elastic member 118 is shown as a helical spring, though any elastic or energy storing devices may be utilized as the elastic member 118. For example, the elastic member 118 may comprise or consist of rubber bands, elastic bands, extension springs, retractable cords, or other elastic components. In yet other embodiments, the elastic member may be a torsion spring that is configured to apply a clockwise torque to the lever arm 108 at or near the pivot point 110.

In the illustrated embodiments of this description, the elastic member 118 is coupled to a mid-portion of the lever arm 108, but the elastic member 118 may be coupled to the lower portion or upper portion of the lever arm 108 as desired. The elastic member 118 is configured to ensure a consistent and even swinging or rocking motion by countering the force applied by the hammock on the pull cord 134 or by assisting the pulling force of the plunger 114. For example, as the hammock reaches a highest swinging point in the first direction (i.e., rightward most point of slot 106 in FIG. 1) and begins to swing in the second direction (i.e., leftward in slot 106), an appreciable amount of slack may exist in the pull cord 134. As the hammock swings in the second direction, the slack is removed from the pull cord 134 and the pull cord 134 engages and applies force to the lever arm 108 to rotate it in a counter-clockwise direction. This relatively instant removal of slack in the pull cord 134 causes a relatively abrupt force to be imparted to the lever arm 108, which tends to jerk or rapidly move the lever arm 108 counter-clockwise. In the absence of elastic member 118, the relatively abrupt force may be sufficient to jerk or pivot the lever arm 108 to the leftmost end of slot 106, which causes the lever arm 108 to prematurely engage the second signaling device 132 and activate the solenoid 112. This premature activation of the solenoid 112 may cause the solenoid 112 to apply a force to rotate lever arm 108 clockwise while the hammock is still swinging in the second direction or before the hammock has reached a highest swinging point in the second direction. The elastic member 118 negates this premature activation of the second signaling device 132 by providing a force that counters the tension in the pull cord when the solenoid 112 is turned off. The counter force prevents the lever arm 108 from being jerked or pivoted to rotate counter-clockwise too rapidly such that it reaches the second pivot end position (i.e. leftmost position) and engages the second signaling device 132, thereby activating the solenoid 112. In this manner, the elastic member 118 functions as a damper to the pivoting force applied to the lever arm 108 and ensures a more consistent and even pivoting of the lever arm 108. The elastic member 118 typically works in cooperation with the pull cord 134, which may itself be an elastic member, to dampen forces between the hammock and the lever arm 108.

Figure 2:
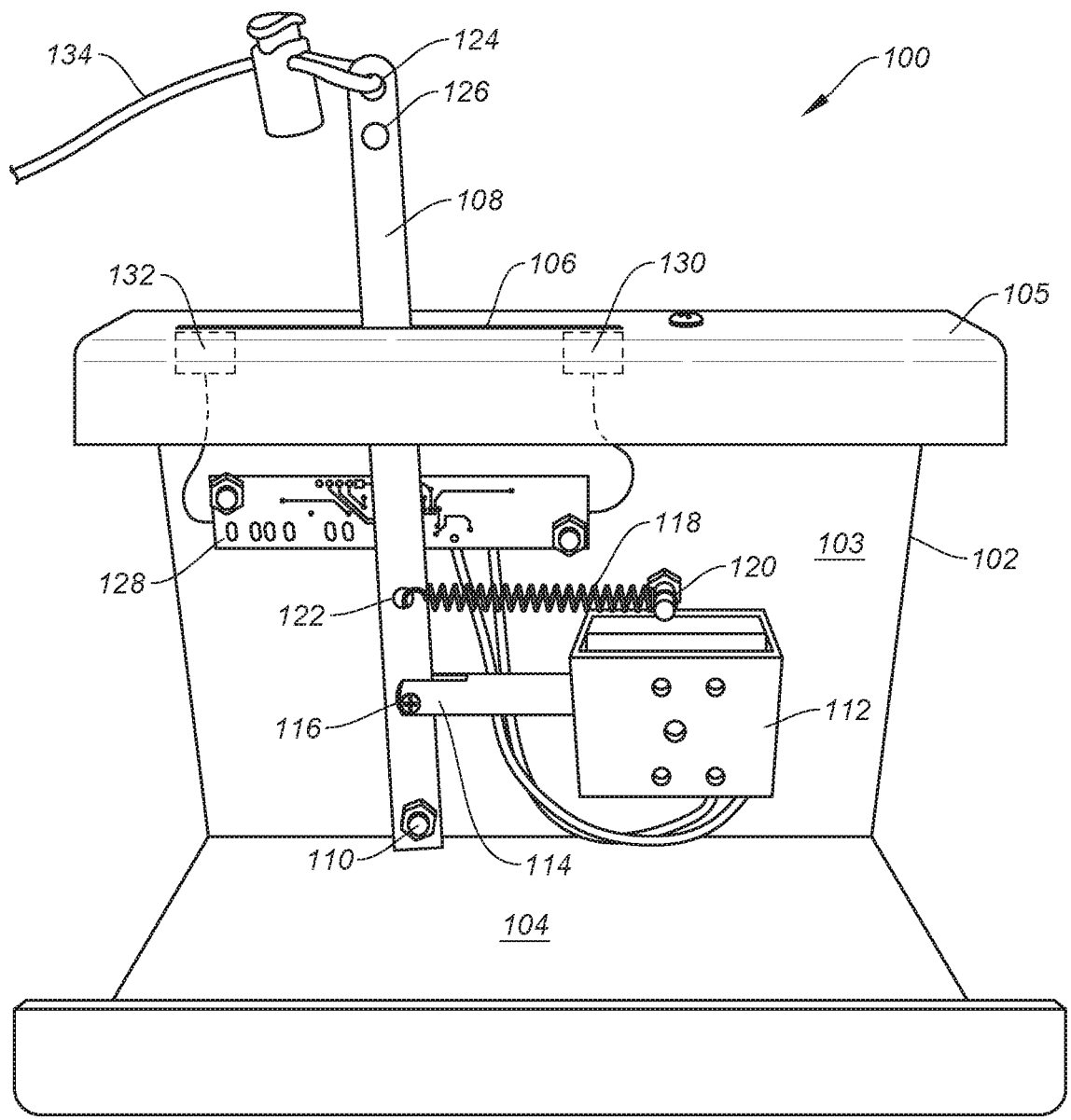
FIG. 2 illustrates the front view of FIG. 1 with the exemplary device in a second stage of operation.
Figure 3:
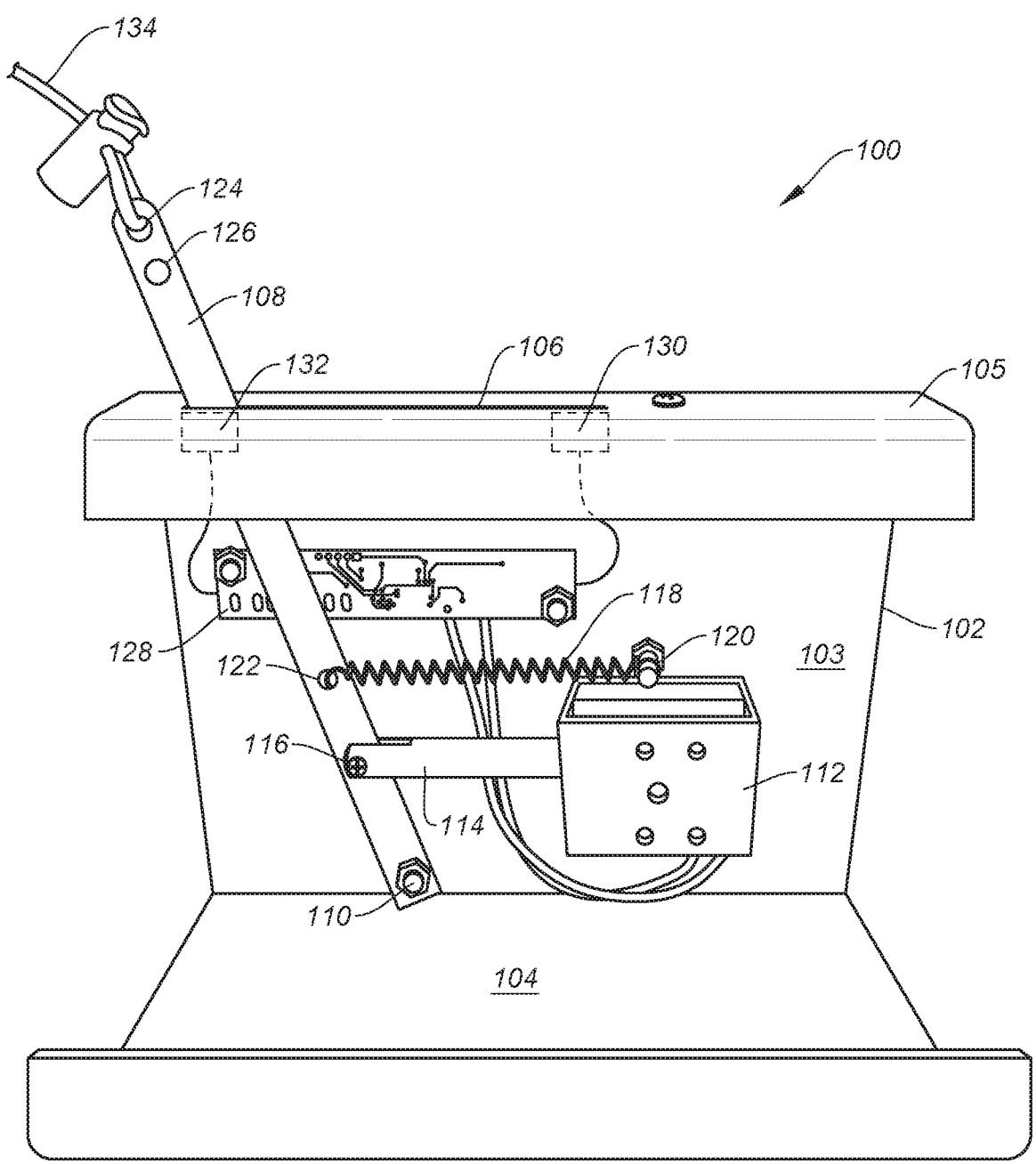
FIG. 3 illustrates the front view of FIG. 1 with the exemplary device in a third stage of operation.

The elastic member 118 also assists in applying a pulling force to the lever arm 108. For example, as the lever arm 108 rotates counter-clockwise, the plunger 114 is pulled out of the solenoid 112. The pulling force that is exerted by the solenoid 112 is weakest at the second pivot end position since the plunger 114 is fully or nearly fully extended from the housing of solenoid 112. Thus, the pulling force that is exerted on the hammock by the solenoid 112 is weakest as the hammock begins to swing rightward from its leftmost position and the pulling force increases as the hammock swings toward the device 100. As illustrated in FIGS. 2 and 3, the elastic member 118 is stretched or elongated as the lever arm 108 rotates counter-clockwise. When the lever arm 108 reaches the leftmost end of slot 106, the elastic member 118 provides a spring force that assists the plunger 114 in pulling the lever arm 108 to rotate clockwise. The elastic member 118 may initiate the rotation of the lever arm 108 away from the leftmost end of slot 106 before the solenoid 112 is activated, which ensures that the solenoid 112 is not activated until the hammock is swinging rightward, or in the same direction as the force applied by the solenoid. The elastic member 118 and plunger 114 may be configured so that the combined force of the elastic member 118 and solenoid 112 on the lever arm 108 is approximately consistent between the second pivot end position and the first pivot end position. Stated differently, the spring force from the elastic member 118 may decrease at roughly an equivalent rate as the solenoid force increases as the lever arm 108 rotates clockwise so that a combined force that is exerted on the lever arm 108 is relatively consistent and uniform as the lever arm rotates.

When the lever arm 108 is positioned at the second pivot end position and the pull cord 134 is fully stretched or extended due swinging of the hammock, the spring force of the elastic member 118 is less than the spring force of the pull cord 134. The spring constant of elastic member 118 is less than the spring constant of the pull cord 134 such that displacement of elastic member 118 produces a lesser spring force than an equivalent displacement of pull cord 134. The spring force of the elastic member 118 ensures that as the lever arm 108 rotates away from the second pivot end position, the lever arm 108 will pivot in a relatively even and uniform manner and will apply a relatively constant pulling force on the hammock as described above. Because the spring force of the pull cord 134 is greater than the elastic member 118, as the pull cord 134 applies force to the lever arm 108, it will cause the elastic member 118 to extend fully before the pull cord 134 stretches or extends. The solenoid 112 provides sufficient force near the end of the stroke to stretch pull cord 134, however the initial force of solenoid 112 and elastic member 118 is insufficient to stretch pull cord 134.

The spring force that is applied by the elastic member 118 may be variable or adjustable. For example, the elastic member 118 may consist of a plurality of rubber bands (not shown) that are each removably coupled to the lever arm 108 via a bolt, boss, capstan, or other feature. The opposite ends of the plurality of rubber bands are secured to the side panel 103. The spring force of elastic member 118 may be varied by removing one or more rubber bands from the bolt, boss, capstan, or other feature, which decouples the one or more rubber bands from the lever arm 108, thereby decreasing the spring force that is applied to the lever arm 108. The spring force of elastic member 118 may be increased by coupling additional rubber bands to the lever arm 108 in like manner. The variability of the spring force allows the pulling force of the lever arm 108 to be varied and customized based on the article being rocked or swung and/or based on the preferences of the individual being rocked or swung. Larger objects such as hammocks or larger furniture will require greater spring force in elastic member 118 while smaller objects such as bassinets or small cradles will require less spring force.

The elasticity of the pull cord 134 and elastic member 118 may be employed in properly positioning the device 100 relative to the hammock. For example, to properly position the device 100, the user may place the device 100 on the ground and pull the device 100 away from the hammock until the lever arm 108 is positioned essentially in the middle of the slot 106 and/or oriented vertically upward (see FIG. 2). At this point, the tension exerted on the lever arm 108 from the pull cord 134 and elastic member 118 is roughly equal and the device 100 is properly oriented relative to the hammock.

In some embodiments, the activation of the solenoid 112 may be delayed via the programming of the control circuit 128 to allow the hammock to begin swinging rightward prior to application of the force from the device 100 or to ensure that the solenoid 112 does not prematurely apply the force on lever arm 108. This delay allows the use of solenoids that are restricted to less-than-continuous operation. In other embodiments, the pull force from solenoid 112 may be continuously applied from the time the lever engages the second signaling device 132 until the lever arm 108 contacts and/or engages with the first signaling device 130, which is positioned at the first pivot end position of the lever arm 108, at the rightmost end of slot 106 as illustrated in FIG. 1. FIG. 1 illustrates the plunger 114 retracted within the solenoid 112 and the lever arm 108 pivoted to a rightward most point. Engagement of the first signaling device 130 may deactivate the solenoid 112.

Another variable that may be adjusted is a ratio of the lever arm 108, which is the ratio of a distance between the pivot point 110 and the attachment point 124 (hereinafter pull cord arm) to a distance between the pivot point 110 and the attachment point 116 (hereinafter solenoid arm). If the lever arm ratio is too low, the device 100 may be pulled toward the hammock as the lever arm 108 is applying the force to swing the hammock rightward or the pulling force may be dissipated without substantially moving the hammock. For example, when the hammock is made of a compliant or flexible material, or if the lever arm ratio is too low, the pulling force may cause the hammock's material to flex and bend without transferring a swinging or rocking motion to the hammock. In such instances, the pulling force is dissipated as the material flexes/bend and returns to an un-flexed state. In contrast, if the lever arm ratio is too high, the lever arm 108 may be too long and the device 100 may not be able to rotate lever arm 108 with sufficient force and time to transmit enough force to maintain a rocking motion with the hammock. The device 100 may have a lever arm ratio of between one and one-half and ten, which is sufficient to ensure that the lever arm ratio is not too low or too high as described above. The lever arm ratio may also be between about three and about six, which provides a very satisfactory function of the device 100 and avoids the potential lever arm ratio issues identified above.

As discussed above, the upper portion of the lever arm 108 may be configured with multiple apertures for attaching the pull cord 134 to the lever arm 108 at the attachment point 124. This variable positioning of the pull cord 134 allows the lever arm ratio to be adjusted as desired, especially when using device 100 with different rocking objects. The variable positioning of the pull cord 134 also allows the stroke length of the lever arm 108 to be varied, which allows the device 100 to accommodate different moveable articles to be rocked. For example, smaller articles, such as infant car seats, require a shorter stroke length than larger articles, such as a hammock. The variable positioning of the pull cord 134 allows the device 100 to accommodate these articles by varying the stroke length. The variable stroke length also allows an intermittent solenoid to be used regardless of the article to be rocked.

FIGS. 2 and 3 illustrate the embodiment of device 100 with the lever arm 108 in different stages of rotation, as would occur during use of device 100. FIG. 2 illustrates device 100 with the lever arm 108 positioned at or near a vertical orientation in a center portion of slot 106. As described above, device 100 is connected to a hammock by pull cord 134 and positioned with respect to the hammock such that the lever arm 108 is substantially vertical. Device 100 may be translated along a supporting surface to achieve a proper placement with respect to the hammock While lever arm 108 is in the vertical position shown in FIG. 2, neither the first signaling device 130 nor the second signaling device 132 registers lever arm 108, and therefore solenoid 112 is disengaged. The state shown in FIG. 2 may represent a neutral state, in which the opposing forces on the lever arm 108 from the pull cord 134 (via the hammock) and the elastic member 118 are balanced. The device 100 is positioned by placing it relative to the hammock such that the lever arm 108 is vertical, balanced between the force of the elastic member 118 and the pull cord 134. That state shown in FIG. 2 may also represent a transition state in which the hammock is swinging leftward of device 100 with solenoid 112 disengaged or in which the hammock is swinging rightward toward the device and the solenoid 112 is engaged and applying a force on lever arm 108 to rotate lever arm clockwise.

FIG. 3 shows the lever arm 108 pivoted to the leftward edge of slot 106 in top panel 105. At this position, second signaling device 132 is engaged by the lever arm 108 to activate the solenoid 112 through control circuit 128 and thereby pull on the lever arm 108 to rotate clockwise and apply a rightward force on the pull cord 134 and hammock. Elastic member 118 is extended or stretched and provides an additional pulling force on the lever arm 108. The engagement of the solenoid 112 and the spring force from the elastic member 118 cause the lever arm 108 to rotate around pivot point 110, which results in rotation of the lever arm 108 as described above.

Figure 4:
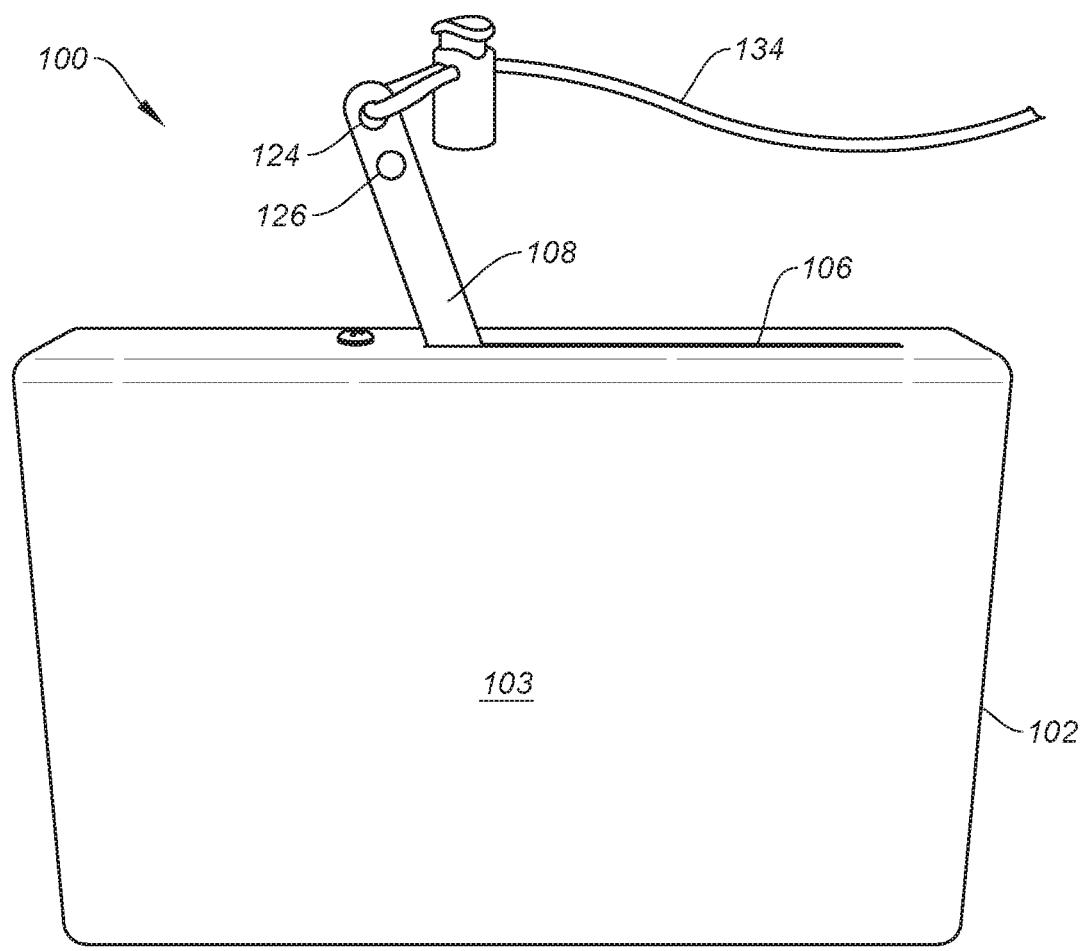
FIG. 4 illustrates a back view of the exemplary device of FIG. 1.

FIG. 4 illustrates a back view of the device 100 of FIG. 1. As illustrated, the lever arm 108 extends from the slot 106 in the top panel 105 of the frame 102. The pull cord 134 attaches to the lever arm 108 at attachment point 124, with an opposite end of pull cord 134 connected to a hammock.

Figure 5:
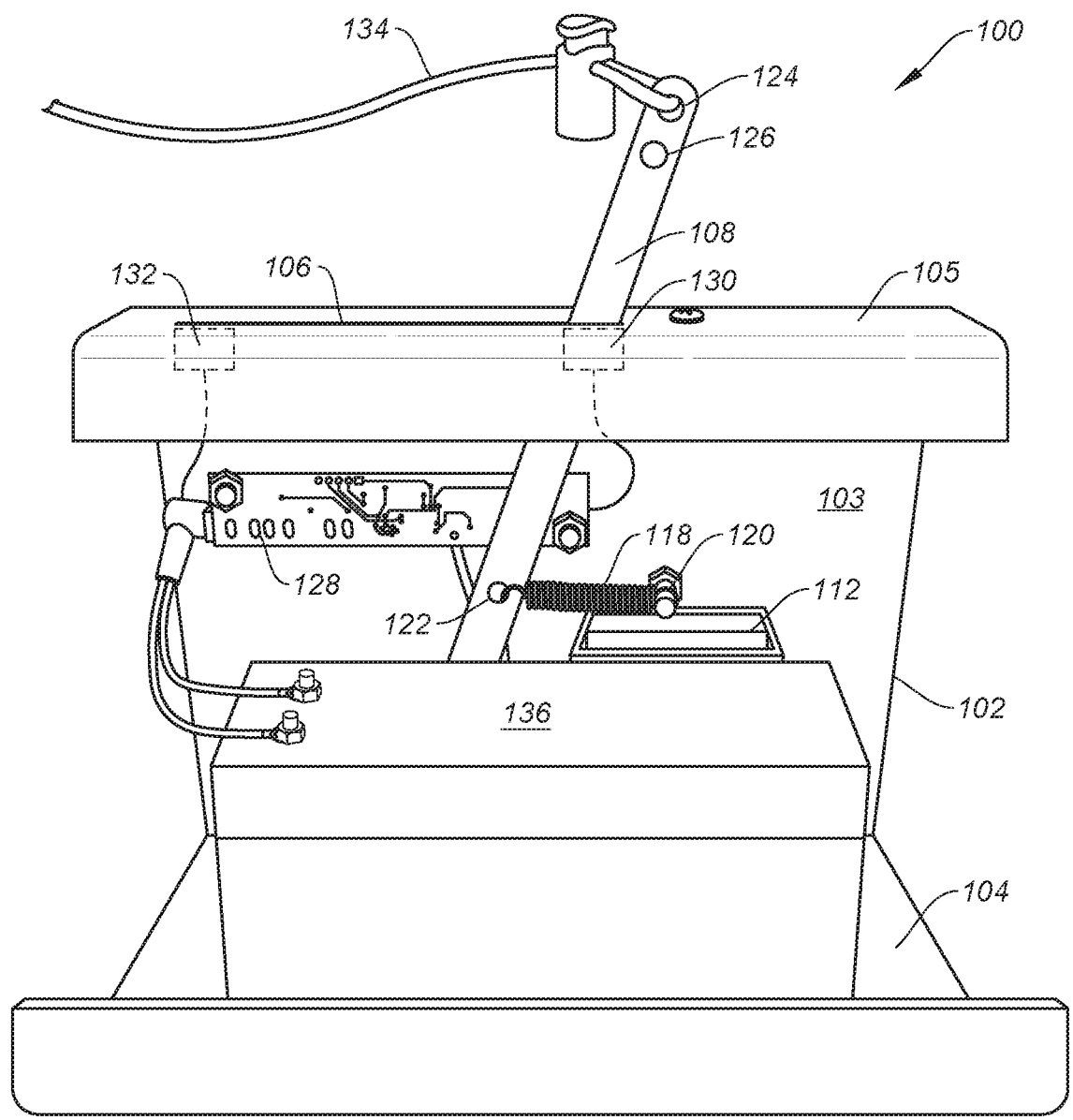
FIG. 5 illustrates a front view of FIG. 1 with a battery pack for operating the exemplary device.

FIG. 5 depicts the device 100 as described above, with the inclusion of a battery 136 to power control circuit 128 and solenoid 112. The battery 136 may be any type of electrical battery having characteristics matching those of the solenoid 112, including voltage and current parameters. Battery 136 rests on the base 104 of the frame 102. The base 104 may be wider than the top panel 105 to provide stability to the device 100 when the device 100 is rocking a hammock. Base 104 also includes a raised edge or lip on the lateral edge to retain the battery 136 on the bottom panel. In some embodiments, the battery 136 may be secured with a releasable securing device such as a belt, snaps, Velcro, or other such devices. The device 100 has sufficient weight to resist movement while in operation without the addition of the battery, and can apply force to the hammock without sliding or shifting the device 100. The device 100 may weigh in a range of between 1 pound and 15 pounds. This range allows the device 100 to be light enough to be portable and easily carried over a distance while being heavy enough to maintain function of the device 100 without sliding on a support surface while in use. In at least one example, the device 100 is in a range of between 6 pounds and 8 pounds. The weight of the battery 136 may also provide additional weight to prevent movement of the device 100 while the device 100 is rocking the hammock. The device may be secured to a supporting surface, such as with stakes driven into the ground.

Figure 6:
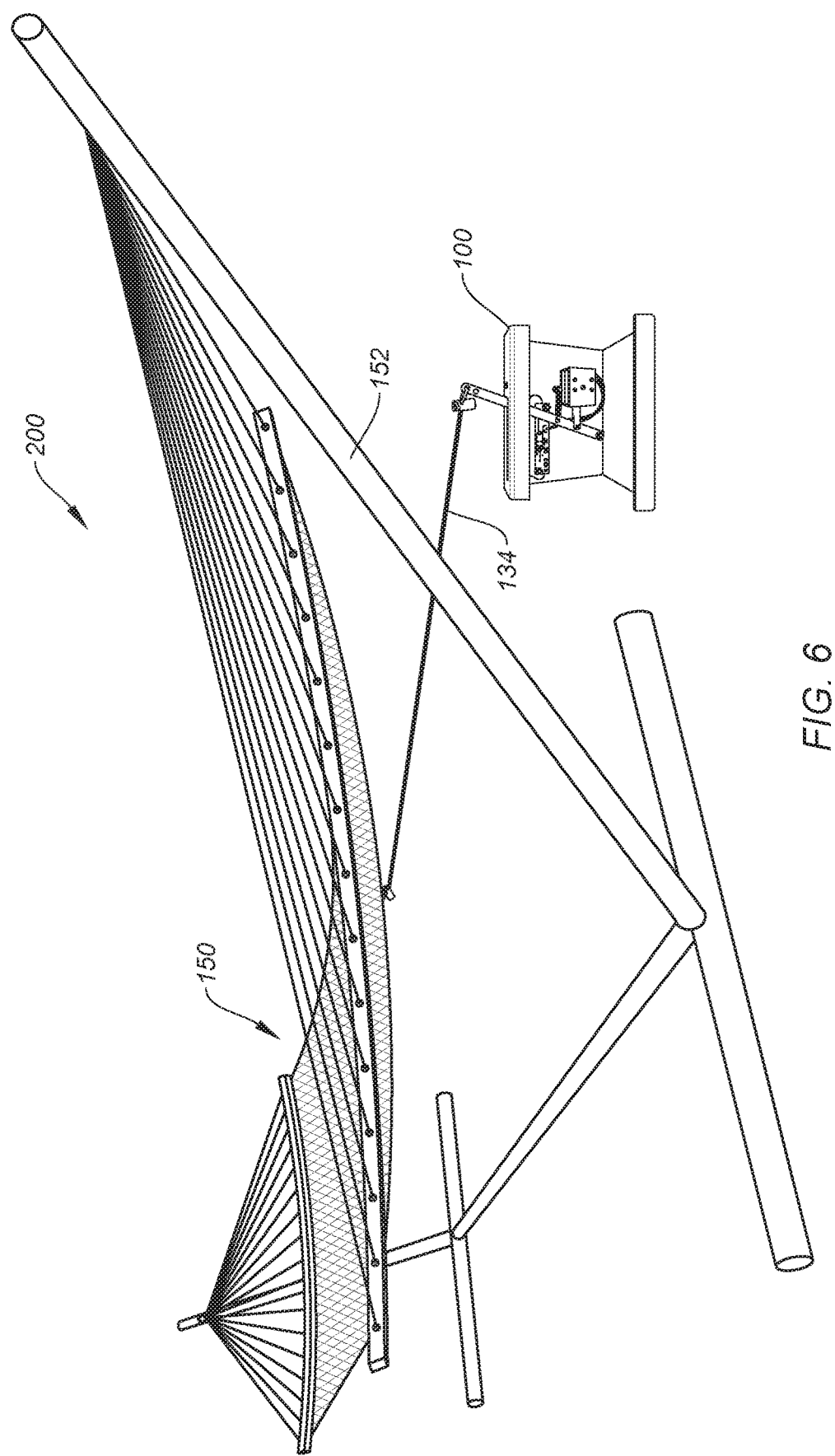
FIG. 6 illustrates a perspective view of a system using the exemplary device of FIG. 1.

FIG. 6 depicts a system 200 for using device 100 in connection with a hammock 150 for rocking the hammock 150. Hammock 150 is depicted as being attached to a frame 152, although in other instances the hammock 150 may be suspended between end supports, such as between two tree trunks. The device 100 is placed on a supporting surface near the hammock 150. The device 100 is connected to the hammock 150 by pull cord 134. Pull cord 134 may include a length adjustment device for adjusting the length of pull cord 134. Device 100 may be placed and the length of pull cord 134 may then be adjusted with the length adjustment device until lever arm 108 is vertical while the hammock is in a neutral position. The device 100 may include a battery 136 as shown in FIG. 5, or may be powered by alternative means as described herein. As the hammock 150 swings in the second direction (e.g., leftward), the lever arm 108 will be pulled in the second direction by the pull cord 134. As lever arm 108 reaches the second pivot end position, it engages with the second signaling device 132 which conveys a signal to the control circuit 128, the control circuit 128 then provides a signal to activate the solenoid 112 and cause a pulling force to be applied to the lever arm 108. The control circuit 128 may perform calculations or determine an appropriate time to activate the solenoid 112, including after a delay from the time the second signaling device 132 conveys the signal to the control circuit 128. The pulling force from the solenoid 112 causes the lever arm 108 to rotate in the first direction (e.g., rightward) within slot 106. The elastic member 118 supplements the pulling force and aids in causing the lever arm 108 to rotate in the first direction. When the lever arm 108 reaches the first pivot end position, the first signaling device 130 is triggered by the lever arm 108, which deactivates the solenoid 112.

During operation, a user initiates the swinging motion of the hammock 150 by giving the hammock 150 a gentle kick/push when getting into the hammock 150. The device 100, connected to the hammock 150 via the pull cord 134, is positioned in the vicinity of the hammock such that when the hammock swings in the leftward direction the lever arm 108 is pulled to rotate counter-clockwise around pivot point 110 by the hammock 150 and pull cord 134 with the solenoid 112 deactivated. As the hammock 150 nears the leftmost apex of its swing, the lever arm 108 is pulled to a position (e.g., the second pivot end position) where the lever arm 108 contacts and/or engages the second signaling device 132, which causes control circuit 128 to activate the solenoid 112. Upon activation, the solenoid 112 applies a force to the lever arm 108, which in turn pulls the pull cord 134 and hammock 150 rightward. More specifically, the solenoid 112 applies a force to the plunger 114, which in turn pulls the lower portion of the lever arm 108 towards the solenoid 112 thereby causing the lever arm 108 to rotate clockwise. The rotation of the lever arm 108 causes a force to be applied to the pull cord 134, which in turn applies a force to the hammock 150 to swing rightward.

Because the timing for applying the pull force is in sync with the natural rhythm of the hammock, once the user initiates the rocking or swing motion of the hammock, the amount of force applied by the device 100 to maintain the swinging motion of the hammock can be very small. Since the force is applied in sync with the natural swinging motion of the hammock, this small force is sufficient to maintain or increase the swinging motion of the hammock. In some embodiments, only a few ounces of force (e.g., between 1 and 12 ounces or between 2 and 8 ounces) are required by the device to continuously rock the hammock.

Figure 7:
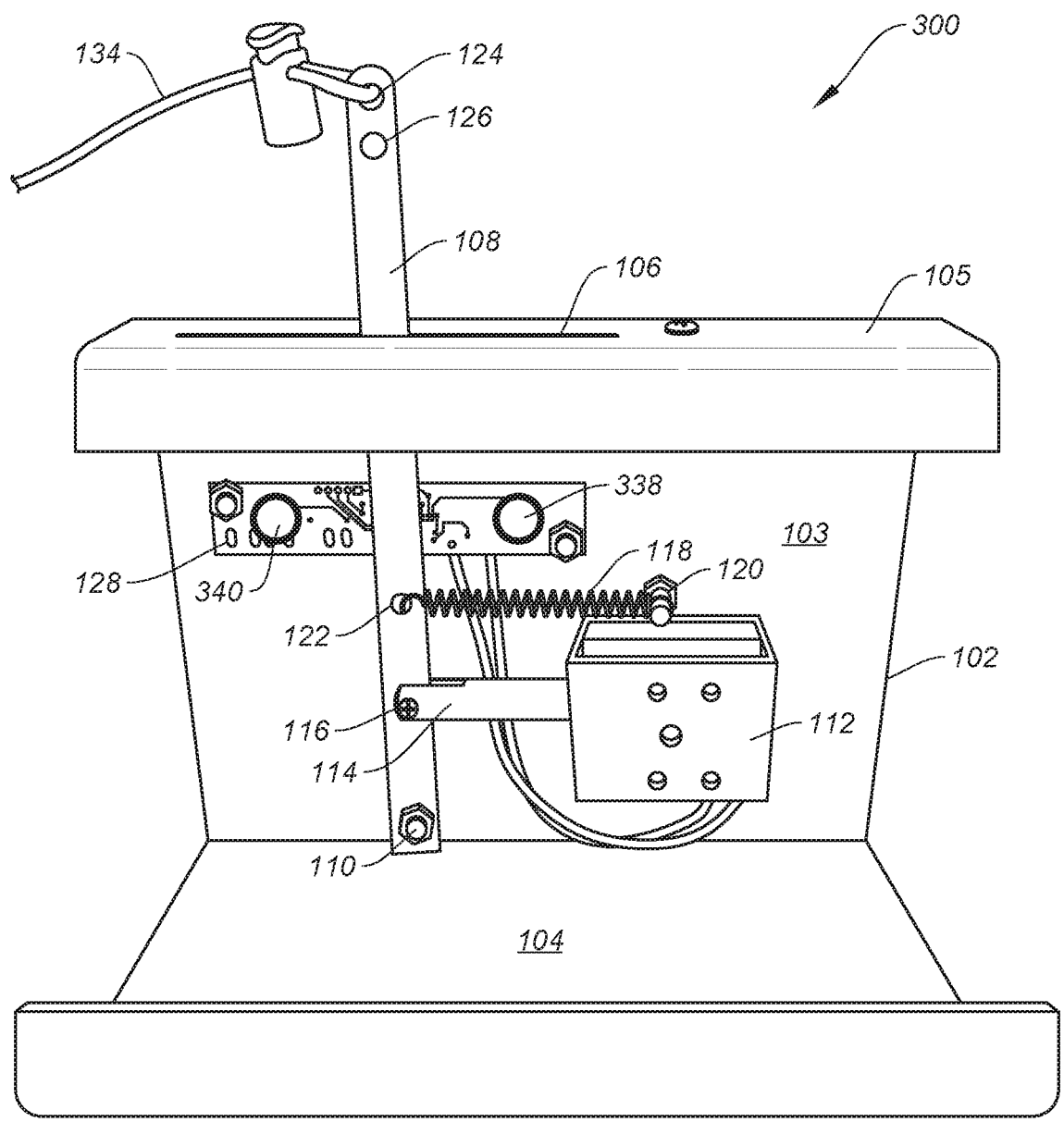
FIG. 7 illustrates a front view of an exemplary device, according to some examples.

Signaling devices 130, 132 may be replaced by inductive sensors 338, 340. FIG. 7 depicts an embodiment in which the device 300 includes inductive sensors 338, 340 that are connected to control circuit 128. The inductive sensors 338, 340 may be hall effect sensors or other similar inductive based sensors which detect the location or presence of metals or markers nearby. In some cases, proximity sensors or tags may also be used. The inductive sensors 338, 340 are operable to sense a position of the lever arm 108 and activate/deactivate the solenoid 112 accordingly. The inductive sensors 338, 340 are positioned on the control circuit 128 such that the position of the lever arm 108 will be sensed by each inductive sensor 338, 340 at or near the end of the rotation of lever arm 108 in each direction. Other elements of FIG. 7 are similar and/or identical to those shown in FIG. 1 and share similar numbers among similar items. The inductive sensors 338, 340 are typically less expensive than active switches and may be employed in a manner that ensures that the solenoid 112 is not activated until the hammock begins to swing in the second direction toward the device 300.

For example, as the lever arm 108 is pulled to the first pivot end position by the hammock and pull cord 134, the lever arm 108 is sensed by a second inductive sensor 340 that is positioned to detect lever arm 108 when lever arm 108 is at or near the leftmost end of slot 106. The control circuit 128, however, is programmed so that the solenoid 112 is not immediately activated Rather, the control circuit 128 is programmed to activate the solenoid 112 after a calculated time delay or upon sensing that the lever arm 108 is pivoting away from the leftmost end of slot 106, which rotation is sensed by the second inductive sensor 340. For example, the control circuit 128 is programmed to calculate a time delay period equivalent to three-quarters of the time the lever arm 108 is at the leftmost end of slot 106 or sensed by the second inductive sensor 340. The lever arm 108 may be pulled from the leftmost end of slot 106, or may begin to rotate due to the swinging of the hammock and the force of pull cord 134. In this manner, the solenoid 112 is not engaged while the hammock is completing its swinging or rocking motion in the leftward direction or while the hammock is temporarily stationary as it transitions from swinging towards the left to swinging towards the right. Rather, the solenoid 112 is only activated as the hammock swings rightward, which ensures that the pulling force applied to the hammock does not oppose or counteract the swinging motion of the hammock. In instances where a continuous duty solenoid is used, rather than an intermittent solenoid, the control circuit 128 will activate the solenoid immediately. A first inductive sensor 338 may be positioned at the rightmost end of slot 106 and may sense when the lever arm 108 has reached the rightmost end of slot 106. The control circuit 128 includes a delay, for example of about one-tenth of one second before deactivating solenoid 112. In some cases, the control circuit 128 may be programmed to immediately deactivate the solenoid 112 when the first inductive sensor 338 senses the lever arm 108 at the rightmost end of slot 106.

Figure 8:
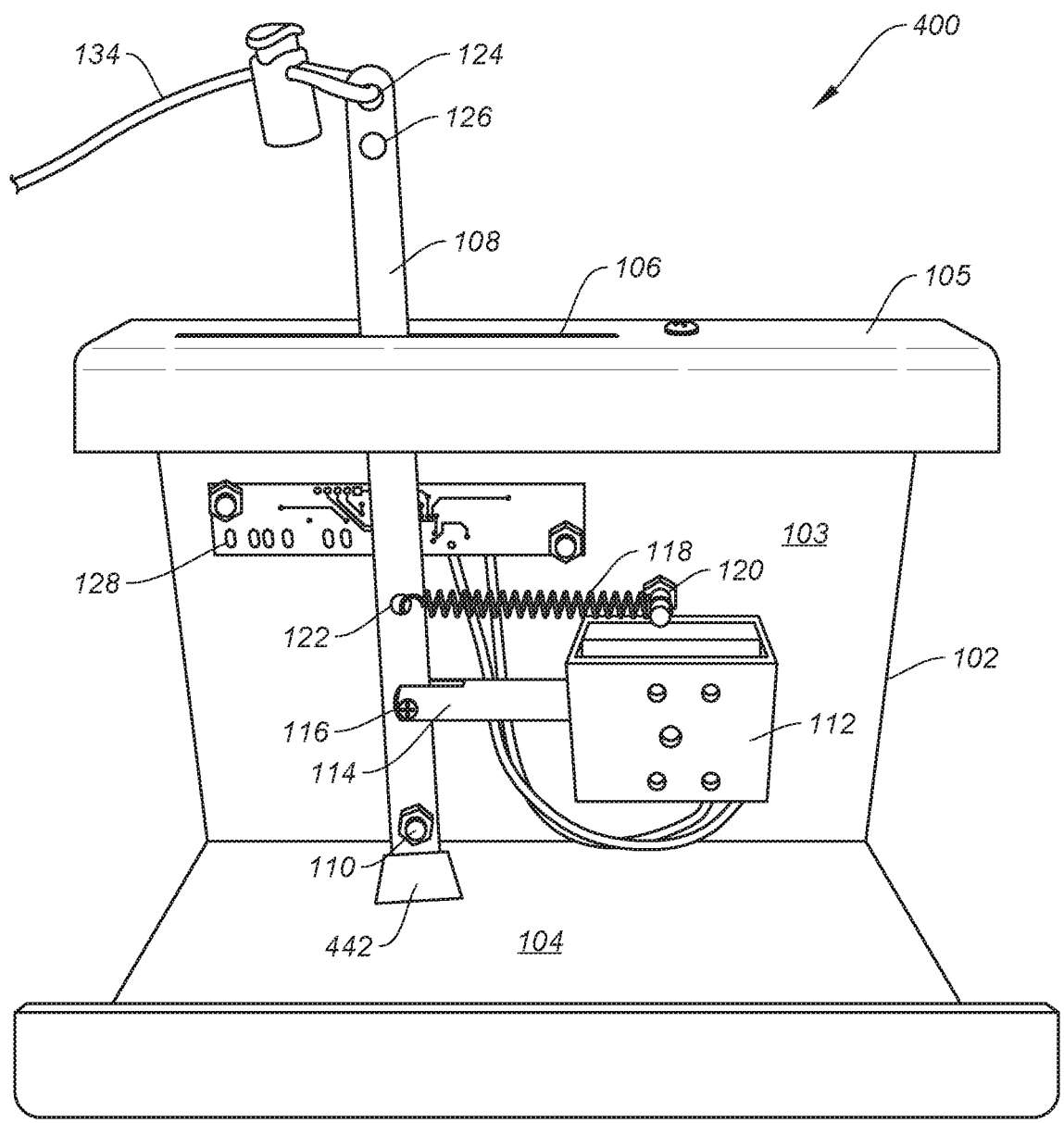
FIG. 8 illustrates a front view of an exemplary device, according to some examples.

FIG. 8 depicts an alternative example embodiment for detecting and switching the solenoid 112 on/off. The majority of the components of device 400 share similar numbering with other devices described above and similar numbers depict similar structures and devices. A sensor 442 is positioned at a bottom or base end of the lever arm 108 opposite the attachment points 116, 122. The short end of the lever arm 108 that is nearest the sensor 442 connects to a moving switch or connector of the sensor 442. The switch or sensor 442 may have a follower or other such device that tracks a position of the lever arm 108 in at least one dimension and that activates an electrical circuit. For example, the sensor 442 may include a micro switch with the short end of lever arm 108 connected to the micro switch. As the lever arm 108 rotates from one end, such as the first position described above, towards the second position, the movement of the short end of lever arm 108 may actuate the micro switch. This may be accomplished through the use of additional devices such as a cam shaped connector that translates motion in one rotational direction, due to the movement of lever arm 108, to a motion which triggers a micro switch. In such examples, no sensors need to be included at or near the slot 106.

The invention has now been described in detail for the purposes of clarity and understanding. However, it will be appreciated that certain changes and modifications may be practiced within the scope of the appended claims.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" and/or "substantially" includes within a tolerance of ±0.01%, ±0.1%, ±1%, ±2%, ±3%, ±4%, ±5%, ±8%, ±10%, ±15%, ±20%, ±25%, or as otherwise known in the art.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. As used herein, the terms "top" and "bottom" can be associated with vertical positions when the air legs of the cleaning machine are oriented vertically. However, in some cases, the cleaning machine may use air legs or configurations in non-vertical directions, in in which case the terms "top" and "bottom" may refer to positions not vertical but oriented diagonally as well. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

What is claimed is:

1. A device for rocking a hammock holding a human, wherein the device comprises:
    a frame having an upper surface defining a slot;
    a lever arm, wherein the lever arm is rotatably coupled with the frame at a pivot point and an upper portion of the lever arm extends outside of the frame through the slot;
    a solenoid coupled with the frame, wherein:
        a plunger of the solenoid is coupled with the lever arm; and
        the plunger, when actuated by the solenoid, rotates the lever arm about the pivot point in a first rotational direction;
    a cord, wherein the cord comprises:
        a first end coupled with an upper half of the lever arm; and
        a second end; and
    a first signaling device coupled with the frame, wherein the solenoid is configured to actuate the plunger upon at least the first signaling device detecting that the lever arm has been rotated about the pivot point in a second rotational direction to a first rotational position, by a hammock coupled with the second end of the cord.

2. The device for rocking a hammock holding a human of claim 1, wherein the cord comprises an elastic member.

3. The device for rocking a hammock holding a human of claim 1, wherein the device further comprises:
    an elastic member configured to rotate the lever arm in the first rotational direction.

4. The device for rocking a hammock holding a human of claim 3, wherein:
    the elastic member directly couples the frame with the lever arm.

5. The device for rocking a hammock holding a human of claim 3, wherein:
    the elastic member pulls the lever arm.

6. The device for rocking a hammock holding a human of claim 1, wherein:
    a lever arm ratio defining a ratio of a first distance to a second distance, the first distance between the pivot point and a first location where the first end of the cord couples with the lever arm and the second distance between the pivot point and a second location where the plunger couples with the lever arm, wherein the lever arm ratio is in a range of 1.5 to 10.

7. The device for rocking a hammock holding a human of claim 1, wherein:
    the plunger, when actuated by the solenoid, pulls the lever arm.

8. The device for rocking a hammock holding a human of claim 1, wherein:
    the plunger, when actuated by the solenoid, pushes the lever arm.

9. The device for rocking a hammock holding a human of claim 1, wherein:
    the device further comprises a processor; and
    the solenoid being configured to actuate the plunger upon at least the first signaling device detecting that the lever arm has been rotated about the pivot point in the second rotational direction to a first rotational position comprises:
        the processor receiving a signal from the first signaling device; and
        the processor causing the solenoid to be powered for a particular length of time in response to at least receiving the signal.

10. The device for rocking a hammock holding a human of claim 1, wherein:
    the device further comprises a magnet coupled with the lever arm;
    the first signaling device comprises a Hall effect sensor; and
    the first signaling device detecting that the lever arm has been rotated about the pivot point in the second rotational direction to the first rotational position comprises the Hall effect sensor detecting the magnet upon the lever arm being in the first rotational position.

11. The device for rocking a hammock holding a human of claim 1, wherein the device further comprises:
    a second signaling device coupled with the frame wherein the solenoid is configured to de-actuate the plunger upon at least the second signaling device detecting that the lever arm has been rotated about the pivot point in the first rotational direction to a second rotational position.

12. The device for rocking a hammock holding a human of claim 11, wherein:
    the device further comprises a processor; and
    the solenoid being configured to actuate the plunger upon at least the first signaling device detecting that the lever arm has been rotated about the pivot point in the second rotational direction to the first rotational position comprises:
        the processor receiving a first signal from the first signaling device; and
        the processor causing the solenoid to be powered in response to at least receiving the first signal; and
    the solenoid being configured to de-actuate the plunger upon at least the second signaling device detecting that the lever arm has been rotated about the pivot point in the first rotational direction to the second rotational position comprises:
        the processor receiving a second signal from the second signaling device; and
        the processor causing the solenoid to not be powered in response to at least receiving the second signal.

13. The device for rocking a hammock holding a human of claim 11, wherein:
    the device further comprises a magnet coupled with the lever arm;
    the first signaling device comprises a first Hall effect sensor;

the second signaling device comprises a second Hall effect sensor;

the first signaling device detecting that the lever arm has been rotated about the pivot point in the second rotational direction to the first rotational position comprises the first Hall effect sensor detecting the magnet upon the lever arm being in the first rotational position; and the second signaling device detecting that the lever arm has been rotated about the pivot point in the first rotational direction to the second rotational position comprises the second Hall effect sensor detecting the magnet upon the lever arm being in the second rotational position.

14. A device for rocking a hammock, wherein the device comprises:

a frame;

a lever arm, wherein the lever arm is rotatably coupled with the frame at a pivot point;

an elastic member coupled with a first location on the lever arm at a first end of the elastic member and coupled to the frame at a second end of the elastic member;

a solenoid coupled with the frame, wherein:
  a plunger of the solenoid is coupled with the lever arm at a second location towards a distal end of the lever arm opposite the pivot point, different from the first location; and
  the plunger, when actuated by the solenoid, rotates the lever arm about the pivot point in a first rotational direction;

a cord, wherein the cord comprises:
  a first end coupled with the lever arm at a third location toward the distal end of the lever arm, further from the pivot point than the second location; and
  a second end; and a first signaling device coupled with the frame, wherein the solenoid is configured to actuate the plunger upon at least the first signaling device detecting that the lever arm has been rotated about the pivot point in a second rotational direction to a first rotational position, by a hammock coupled with the second end of the cord.

15. The device for rocking a hammock of claim 14, wherein the elastic member comprises a spring member that couples the lever arm to the frame.

16. The device for rocking a hammock of claim 14, wherein:

the device further comprises a processor; and the solenoid being configured to actuate the plunger upon at least the first signaling device detecting that the lever arm has been rotated about the pivot point in the second rotational direction to a first rotational position comprises:

the processor receiving a signal from the first signaling device; and the processor causing the solenoid to be powered for a particular length of time in response to at least receiving the signal.

17. The device for rocking a hammock of claim 14, wherein the device further comprises:

a second signaling device coupled with the frame wherein the solenoid is configured to de-actuate the plunger upon at least the second signaling device detecting that the lever arm has been rotated about the pivot point in the first rotational direction to a second rotational position.

18. The device for rocking a hammock of claim 17, wherein:

the device further comprises a processor; and the solenoid being configured to actuate the plunger upon at least the first signaling device detecting that the lever arm has been rotated about the pivot point in the second rotational direction to the first rotational position comprises:

the processor receiving a first signal from the first signaling device; and the processor causing the solenoid to be powered in response to at least receiving the first signal; and the solenoid being configured to de-actuate the plunger upon at least the second signaling device detecting that the lever arm has been rotated about the pivot point in the first rotational direction to the second rotational position comprises:

the processor receiving a second signal from the second signaling device; and the processor causing the solenoid to not be powered in response to at least receiving the second signal.

19. A device comprising a frame;

a lever arm, wherein the lever arm is rotatably coupled with the frame at a pivot point;

an elastic member connected between the frame and the lever arm;

a solenoid coupled with the frame, wherein:
  a plunger of the solenoid is coupled with the lever arm; and
  the plunger, when actuated by the solenoid, rotates the lever arm about the pivot point in a first rotational direction;

a cord connected to an upper portion of the lever arm and configured to connect to a swinging device, wherein a force required to stretch the cord is greater than zero and is less than a maximum force produced by the solenoid; and a first signaling device coupled with the frame, wherein the solenoid is configured to actuate the plunger upon at least the first signaling device detecting that the lever arm has been rotated about the pivot point in a second rotational direction to a first rotational position, by a swinging element coupled to the lever arm.

20. The device of claim 19, wherein the elastic member is configured to rotate the lever arm in the first rotational direction.

* * * * *